United States Patent
Nagula (10) Patent No.: US 11,409,963 B1
(45) Date of Patent: Aug. 9, 2022

(54) GENERATING CONCEPTS FROM TEXT REPORTS

(71) Applicant: Pivotal Software, Inc., San Francisco, CA (US)

(72) Inventor: Pavan Kumar Nagula, Singapore (SG)

(73) Assignee: Pivotal Software, Inc., Palo Alto, CA (US)

( * ) Notice: Subject to any disclaimer, the term of this patent is extended or adjusted under 35 U.S.C. 154(b) by 453 days.

(21) Appl. No.: 16/679,125

(22) Filed: Nov. 8, 2019

(51) Int. Cl.
*G06F 40/30* (2020.01)
*G06N 5/04* (2006.01)
*G06N 20/00* (2019.01)

(52) U.S. Cl.
CPC ............. *G06F 40/30* (2020.01); *G06N 5/04* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,654,739 B1 * | 11/2003 | Apte | ...................... | G06F 16/355 707/999.005 |
| 7,366,705 B2 * | 4/2008 | Zeng | ...................... | G06F 16/355 706/20 |
| 9,672,279 B1 * | 6/2017 | Cohen | ...................... | G06N 7/00 |
| 2003/0154181 A1 * | 8/2003 | Liu | ...................... | G06K 9/6226 |
| 2019/0325066 A1 * | 10/2019 | Krishna | ................... | G06N 3/08 |

OTHER PUBLICATIONS

See et al. [online], "Get To the Point: Summarization with Pointer-Generator Networks," arXiv:1704.04368, submitted on Apr. 14, 2017, last revised on Apr. 25, 2017, 20 pages.
Stackoverflow.com [online], "Compute the 'elbow' for a curve automatically and mathematically," Stack Overflow Public Question asked by user Jie, posted Dec. 17, 2010, last updated May 9, 2019, [retrieved Dec. 31, 2019] retrieved from URL <https://stackoverflow.com/questions/4471993/compute-the-elbow-for-a-curve-automatically-and-mathematically>, 4 pages.
Satopaa et al., "Finding a "Kneedie" in a Haystack: Detecting Knee Points in System Behavior," 31st International Conference on Distributed Computing Systems Workshops, Jun. 2011, 6 pages.

* cited by examiner

*Primary Examiner* — Nafiz E Hoque
(74) *Attorney, Agent, or Firm* — Fish & Richardson P.C.

(57) ABSTRACT

Methods, systems, and apparatus, including computer programs encoded on computer storage media, for automatic text report concept generation. Generating concepts from text reports includes receiving a collection of text reports; performing a clustering process for a plurality of different cluster sizes; evaluating each of the plurality of different cluster sizes to select an optimal cluster size; generating, from the collection of text reports, clusters using the selected optimal cluster size; aggregating text associated with text reports in each cluster; maintaining a training dataset comprising the aggregated text; and generating a predictive model from the training dataset to generate a concept for an input text report.

20 Claims, 4 Drawing Sheets

GENERATING CONCEPTS FROM TEXT REPORTS

BACKGROUND

This specification relates to automatic text summarization.

Text summarization refers to techniques that aim to generate, from a corpus of text, a more text description that encapsulates the most important information from the corpus of text. The size of the generated summaries depends on the processing pipeline and machine-learning models that are involved. Text summaries can be automatically generated by various types of machine-learning models, including deep neural networks, that take as input a portion of text and generate as output a summary of the text.

One example use case for automatic text summarization is for distilling user feedback in an organization. Users can submit feedback to an organization, e.g., through an online feedback form, and the organization can use automatic text summarization to help analyze and respond to the user feedback in a more efficient way.

However, using sophisticated text summarization models can be impractical in many scenarios due to the processing power that is required. If an organization receives thousands of user feedback reports per day or per week, it can take many hours to process all the reports using deep neural networks.

Another problem with automatic text summarization is that the results can be highly duplicative. For example, if an organization receives 100 reports that are all about a service outage on a particular weekday, an automatic text summarizer might generate 100 summaries that are all largely duplicative of one another.

Lastly, sophisticated text summarization models can be unsuitable when the reports to be processed have a similar size to the output. For example, some deep neural network models can generate text summaries that are on the order of 100 words. But when processing 100-word user feedback reports, the output often simply repeats the input.

SUMMARY

This specification describes how a system can automatically generate concepts from large corpuses of text report. In this specification, a concept is an automatically generated portion of text that is smaller, and typically much smaller, than the text input. The exact size of the concept depends on the implementation of the models that are involved, but typically, the generated concepts are between 5 and 100 words in length, whereas the text corpuses are typically thousands or millions of words in length.

Particular embodiments of the subject matter described in this specification can be implemented so as to realize one or more of the following advantages.

First, implementation of the disclosed technologies dramatically reduces the amount of computational resources (e.g., memory, computing power, or both) that is otherwise required using conventional techniques for concept generation from text reports, e.g., techniques that do not involve partitioning the large corpuses of text reports into an optimal number of clusters or selection of representative text from clusters in real-time. In some cases, generating concepts using the disclosed technologies reduces the total amount of computational time by as much as 90 percent, when compared to the conventional approaches.

Second, the techniques accurately identify concepts that are repeatedly discussed in text reports.

Third, the techniques reduce laborious manual intervention in generation of concepts which, in tradition, can take weeks together.

Fourth, augmenting the dataset used in training the predictive models with publicly available datasets addresses issues that relate to data shortage. Typically, obtaining high-quality training examples that each include a text report and desired concept can be a very expensive and difficult process. The technique of data augmentation allows a suitable predictive model to be sufficiently trained even with a limited number of available training examples.

Lastly, the disclosed technologies can be deployed in any organizations including, for example, government agencies, banks, and hospitals, where real-time concept generation from text reports can help human decision makers to understand nature of the text reports, to gain insights for improving operational efficiency, and especially, to improve user experience of people using the services provided by such organizations.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
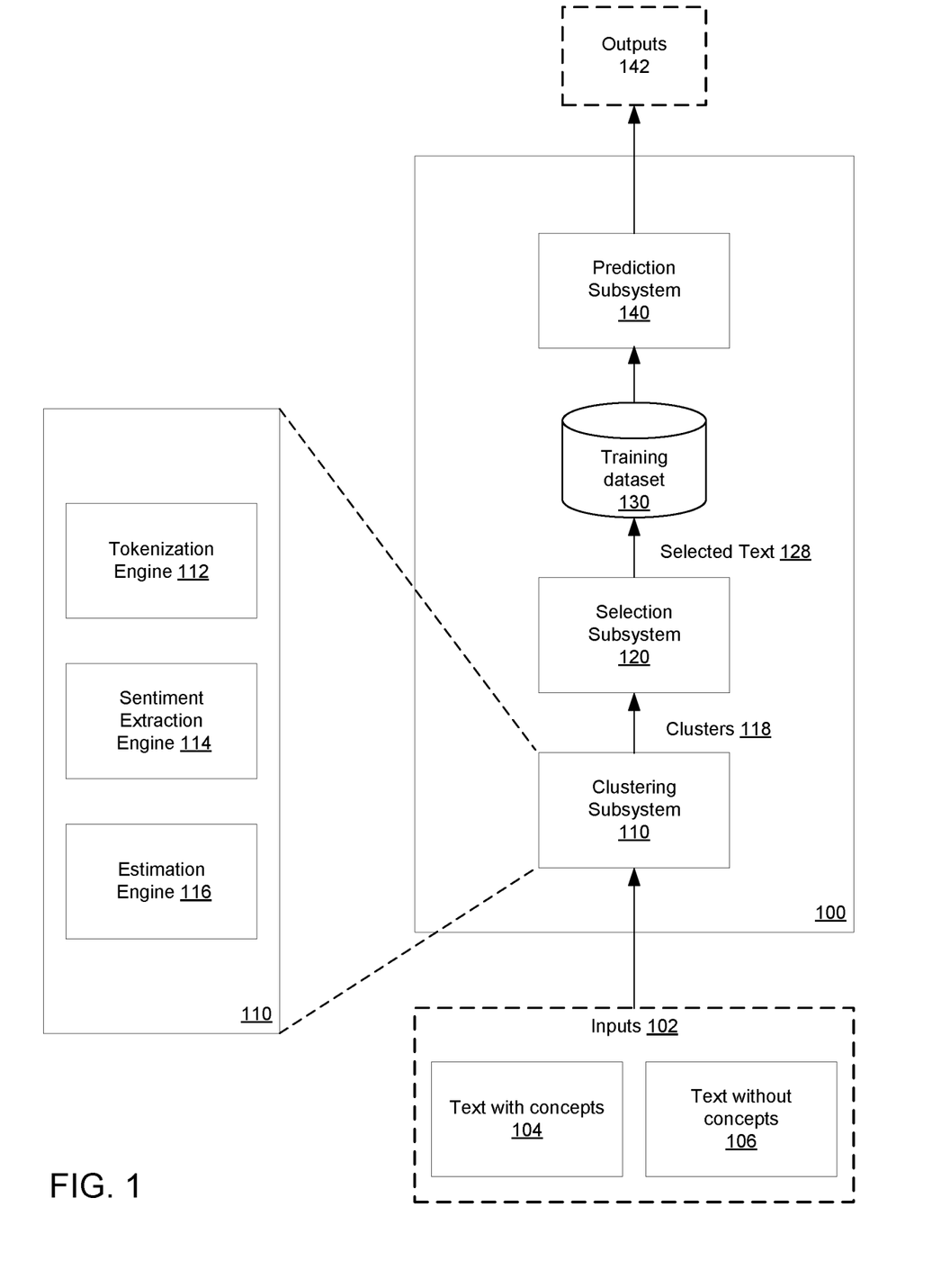
FIG. 1 is a block diagram illustrating an example system.

FIG. 1 is a block diagram of an example system 100. The system 100 is an example of a system implemented as computer programs on one or more computers in one or more locations, in which the systems, components, and techniques described below can be implemented.

The system 100 is configured to receive inputs 102. The inputs 102 can include a collection of text reports, e.g., emails, support tickets, product reviews, survey responses, user feedbacks, and the like. The text reports can have various forms.

In some implementations, the inputs 102 includes a first portion of text reports 104 that are associated with respective concepts and a second portion of text reports 106 that are not associated with concepts. Optionally, the collection of the text reports are all associated with a same issue in an organization.

In general, for each text report, an associated concept refers to the subjective information (e.g., perspective, sentiment, or both) of a person with respect to one or more issues included in the text report. The person can be either an author or a reader of the text report.

For example, for a text report that describes an accident involving a cyclist crashing into a pedestrian walking on pavement, the associated concept can specify that the cyclist is at fault. As another example, for a text report that describes an unsatisfying shopping experience with a retail service provider, the associated concept can specify that approaches to improve user experience are required. As yet another example, for a text report reporting a series of restaurant food poisoning incidents, the associated concept can specify a sentiment of disappointment. In these examples, the original text reports are each thousands (or tens of thousands) of words in length, while each concept is much shorter, e.g., between 5 and 100 words in length.

The system 100 includes a clustering subsystem 110. In general, the clustering subsystem 110 includes software executing on one or more processors and causes the one or more processors to partition the collection of text reports either with or without associated concepts into multiple clusters.

For example, the clustering subsystem 110 partitions the first portion of text reports 104 that are associated with respective concepts into multiple clusters 118. Each cluster includes a category of text reports that share similar concepts, i.e., describe one or more issues towards which people share similar subjective information (e.g., perspective, sentiment, or both). In some implementations, the clustering subsystem 110 also aggregates text associated with text reports during or after the clustering process. In such implementations, the clustering subsystem 100 generates respective aggregated text for each cluster that is associated with a corresponding concept.

In some implementations, either before or during the clustering process, the clustering subsystem 110 uses a tokenization engine 112 to generate tokenized representations of input text reports. The tokenized representation provides corresponding subjective information of the input text reports. The tokenization engine 112 may be configured as, for example, a doc2vec model, a bag-of-words model, a fastText model, and so on. Typically, representing text in vectorized, numeric, or any other software-friendly forms enables software to more smoothly and effectively process text inputs. It should be noted that, for convenience, the description below will only refer to text or text reports, even when corresponding tokenized representations of the text or text reports could also be referred to.

The clustering subsystem 110 also includes a sentiment extraction engine 114. The sentiment extraction engine 114 implements software that is configured to automatically perform sentiment analysis on text reports in order to identify and extract affective states, subjective information, or both.

For example, the sentiment extraction engine 114 can process a text report from the second portion of text reports 106 that are not associated with concepts in order to identify opinions or sentiment of people with respect to one or more issues that are described in the text report.

After sentiment extraction, the clustering subsystem 110 can partition the second portion of text reports 106 into multiple clusters 118. Each cluster includes a category of text reports that share similar sentiment, i.e., describe one or more issues towards which people share similar opinions or sentiment. In some implementations, the clustering subsystem 110 also aggregates text associated with text reports during or after the clustering process. That is, the clustering subsystem 110 generates respective aggregated text for each cluster that is not associated with a corresponding concept.

In some implementations, prior to performing the clustering process, the clustering subsystem 110 uses an estimation engine 116 to determine an optimal size of cluster. As will be described in more detail below with respect to FIG. 2, the estimation engine 116 evaluates respective qualities of clusters in different sizes using one or more suitable metrics. Accordingly, the estimation engine 116 identifies an optimal cluster size for each cluster. In such implementations, the clustering subsystem 110 generates clusters using the selected optimal size. In other words, the clustering engine 110 partitions the second portion of text reports 106 into a specific number of clusters that each have the selected optimal size.

The system 100 also includes a selection subsystem 120. Once both collections of texts with and without concepts are partitioned into respective clusters, the system 100 can use the selection subsystem 120 to select representative text from each cluster. Alternatively, the system 100 can use the selection subsystem 120 to select representative text directly from the inputs 102, i.e., without partitioning the collection of text reports using the clustering subsystem 110.

The selection subsystem 120 includes software executing on one or more processors and causes the one or more processors to select one or more text using graph processing from each cluster. Specifically, for each cluster, the one or more selected text 128 correspond to the representative text of the cluster.

The system 100 further includes a prediction subsystem 140. The prediction subsystem 140 includes one or more predictive models of various types, including machine learning models (e.g., deep neural networks) that are each configured to receive as input text reports (or portions of text reports), process the input in accordance with current parameter values of the model, and to generate as output 142 corresponding concepts of the text reports in the input.

To allow the predictive models to learn to generate correct concepts for the input text, the system 100 maintains (e.g., in a physical data storage device) a training dataset 130 for use in training the models using appropriate machine learning training techniques (e.g., supervised learning or reinforcement learning). The training data included in the training dataset 130 can be obtained, at least in part, from the selected text 128.

In some implementations, the system 100 divides the training dataset into a training subset, a validation subset, and a test subset. Specifically, both the training and validation subset includes text selected from the first portion of text reports. That is, the text in the training and validation subset is usually associated with text reports that have corresponding concepts. On the other hand, the test subset include text selected from the second portion of text reports. That is, the text in the test subset is usually associated with text reports that do not have corresponding concepts.

Figure 2:
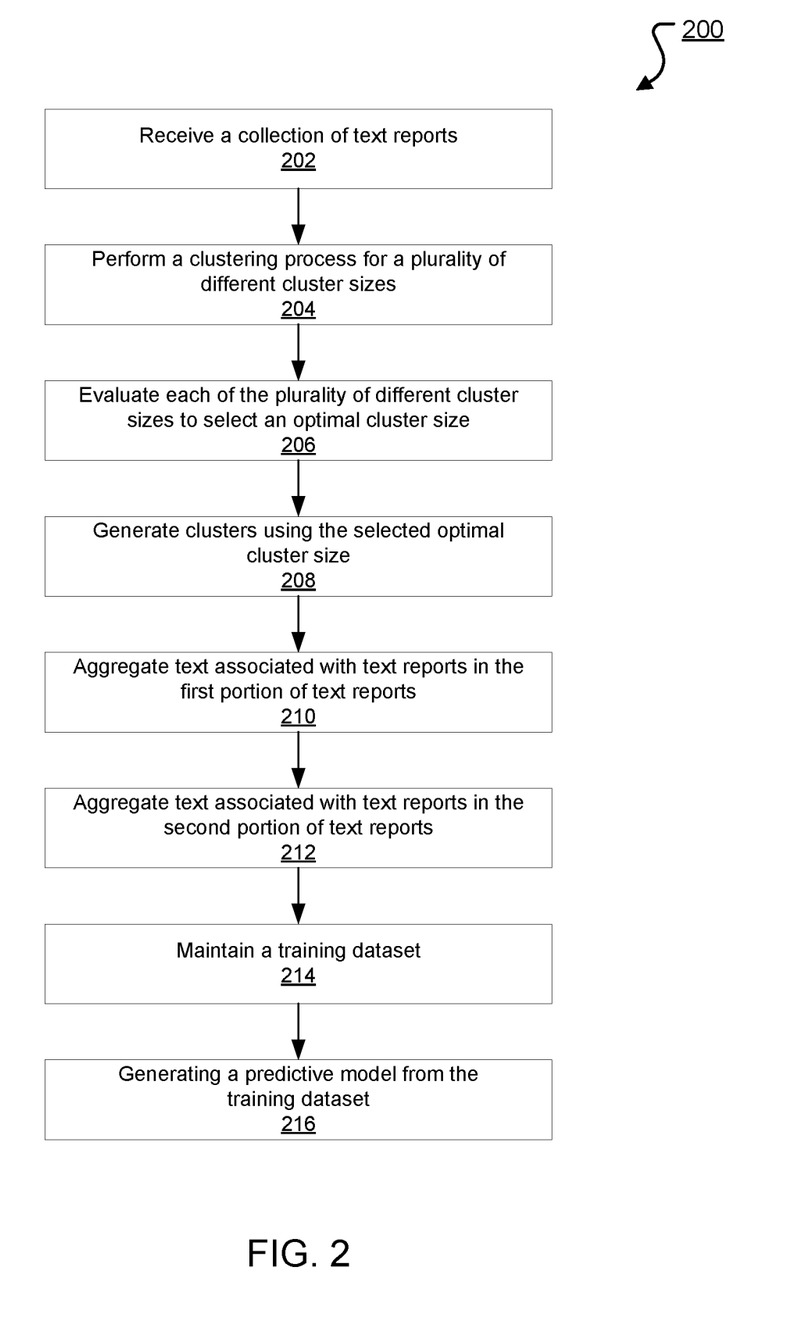
FIG. 2 is a flowchart illustrating an example process of generating a predictive model.

FIG. 2 is a flowchart illustrating an example process 200 of generating a predictive model. For convenience, the process 200 will be described as being performed by a system of one or more computers located in one or more locations. For example, the system 100 of FIG. 1, appropriately programmed in accordance with this specification, can perform the process 200.

The system receives a collection of text reports (202). The collection of text reports includes (i) a first portion of text reports that are associated with respective concepts and (ii) a second portion of text reports that are not associated with concepts. For each text report in the first portion of text reports, the associated concept can be in a single file with the text report or it can be in a separate data entity, e.g., a comma-separated value file, a text file, or a rich text format file.

The system performs a clustering process for a plurality of different cluster sizes (204) on the second portion of text reports which do not have associated concepts. In general, clustering is a process of assigning text reports having similar subjective information (e.g., perspective, sentiment, or both) to a same respective cluster. The system may do so by performing sentiment analysis on one or more text reports in the second portion of text reports to identity, from each of the one or more text reports, corresponding subjective information of people with respect to one or more issues that are described in the text report.

Once respective sentiment has been identified, the system can proceed to partition the second portion of text reports into multiple clusters. Each cluster includes a category of text reports that share similar subjective information. However, determining an optimal size for each cluster can be difficult, especially when an excessive amount of sentiment has been identified from the text reports.

Therefore, in some implementations, the system performs a clustering process for a plurality of different cluster sizes in order to determine the optimal cluster size of the cluster. Specifically, for each cluster size of the plurality of different cluster sizes, the system generates a plurality of different clusters of text reports from the second portion of the text reports.

The system evaluates each of the plurality of different cluster sizes to select an optimal cluster size (206). In general, the system can evaluate each of the plurality of different cluster sizes using any suitable metric or combination of metrics.

As one example, the metric is within cluster sum of squared error. In brief, the within cluster sum of squared error measures the variability of the text reports within each cluster. The system can calculate respective within cluster sum of squared errors for the various clusters in different sizes.

The system then selects the optimal cluster size by comparing the evaluation results using any suitable metric or combination of metrics. As one example, the metric is silhouette score. In brief, the silhouette score measures average distance between text reports in a same cluster compared against average distances between text reports in other clusters. The distance can be calculated with any distance metric, such as Euclidean distance or Manhattan distance.

In some implementations, the system can compute respective second derivatives (e.g., through central difference approximation) of the evaluation results with respect to different cluster sizes. From the computed second derivatives, the system identifies a particular cluster size where corresponding evaluation result ceases improving significantly despite further increase of cluster sizes. Accordingly, the system selects the particular cluster size as the optimal cluster size.

The system generates clusters using the selected optimal cluster size (208). That is, the system partitions the second portion of text reports in to a specific number of clusters that each have the selected optimal cluster size. Typically, generating clusters using the selected optimal cluster size yields respective clusters that each include as many text reports with similar concepts as possible, and yet exclude as many text reports with distinct concepts as possible.

In some implementations, the system aggregates text associated with text reports in the first portion of text reports (210) to generate respective first aggregated text for each cluster that is associated with a corresponding concept. In particular, the first portion of text reports include text reports that have associated concepts. Each cluster includes text reports that share similar concepts.

For example, if the tokenized representation of text reports is in the form of vector, the system can concatenate respective vectors included in each cluster into a single vector. Each single vector in turn represents all text reports that are included in the corresponding cluster.

In some implementations, the system aggregates text associated with text reports in the second portion of text reports (212). That is, the system generates respective second aggregated text for each cluster of the clusters generated using the selected optimal cluster size.

The system maintains a training dataset (214) for use in training a predictive model. In some implementations, the system obtains the text, and, optionally, associated concepts from the multiple clusters generated from the collection of input text reports. Optionally, the system selects representative text from each cluster to be specifically maintained in the training dataset. Selecting text from each cluster using graph processing will be described in more detail below with reference to FIG. 4.

The system divides the dataset into a training subset, a validation subset, and, optionally, a test subset. Specifically, the training and validation subsets both include text that is selected from text reports that are associated with corresponding concepts. In other words, the training and validation subset includes text that is associated with the first portion of text reports.

In some implementations, the system also obtains the text (and, optionally, associated concepts) from publically available datasets. In this manner, the system augments the training dataset with a corpus of publically available text in order to address issues that relate to shortage in training data. Such issues can happen, for example, when only a limited number of text reports are received and therefore may not have enough training data for use in training the predictive model.

The system generates a predictive model from the training dataset (216). In general, the predictive model can be any appropriate machine learning model that is capable of generating corresponding concepts for input text reports. Such machine learning model can be, for example, a support vector machine (SVM) model, a Bayesian Networks model, or a deep neural network, i.e., a feedforward neural network or a recurrent neural network.

The predictive model is configured to process an input that includes text reports in accordance with current values of model parameters to generate an output that specifies one or more corresponding concepts for the input text report.

Generating a predictive model typically involves training the predictive model on training data in order to determine respective trained values of the model parameters. In particular, the system trains the predictive model on the training subset. During the training process, the system periodically evaluates the performance of the predictive model on the validation subset in order to fine-tune the architecture and respective hyper-parameter values of the predictive model.

Figure 3:
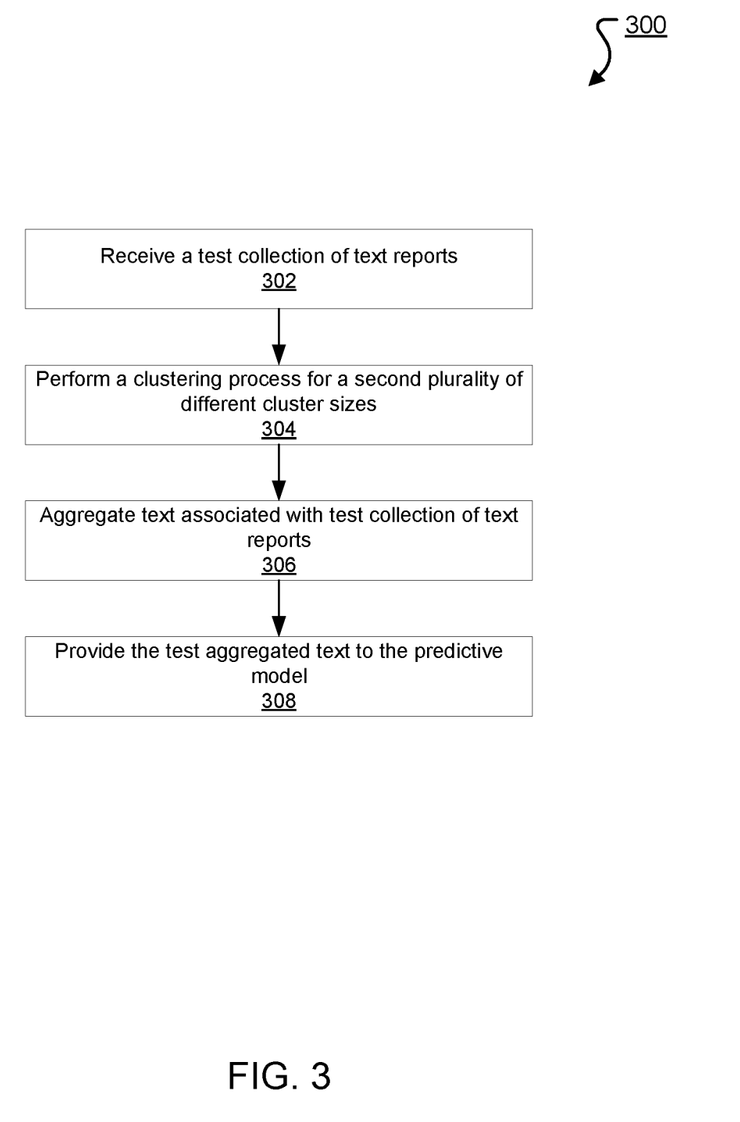
FIG. 3 is a flowchart illustrating an example process of generating respective concepts for text reports.

FIG. 3 is a flowchart illustrating an example process 300 of generating respective concepts for text reports. For convenience, the process 300 will be described as being performed by a system of one or more computers located in one or more locations. For example, the system 100 of FIG. 1, appropriately programmed in accordance with this specification, can perform the process 300.

In general, the system can repeatedly perform the process 300 for each additional test collection of text reports this is received. Each test collection of the text reports can include, for example, text reports that are associated with a same issue in an organization.

The system receives a test collection of text reports (302) for which concepts are to be generated. In other words, some or all of the text reports included in the test collection are not associated with corresponding concepts.

The system performs the clustering process for a second plurality of different cluster sizes (304) and evaluates each of the second plurality of different cluster sizes to select a second optimal cluster size. The system may do so by similarly following the process described above with reference to steps 204-206.

The system aggregates text associated with the test collection of text reports (306) to generate test aggregated text for each cluster of the clusters generated using the second optimal cluster size. In other words, the system partitions the text reports included in the test collection into a specific number of clusters that each have the second optimal cluster size.

The system provides the test aggregated text to the predictive model (308), for example, by adding the test aggregated text to the test subset. Alternatively and more advantageously, the system specifically provides text selected from the test aggregated text to the predictive model. Selecting text from the test aggregated text using graph processing will be described in more retail below with reference to FIG. 4. Once being trained, the predictive model can be configured to generate respective concepts for the text maintained in the test subset, including the test collection of text reports.

In some implementations, the system augments the training dataset with text associated with the test collection of text reports and corresponding concepts generated by the predictive model. For example, for some or all of the text reports from the test collection, the system can add the associated text and generated concept to the training and validation subset.

In such implementations, the system also regenerates the predictive model using augmented training dataset that has the generated concepts for the received test collection of test reports. Regenerating the predictive model involves retraining the model on the augmented training dataset in order to update respective model parameters.

Figure 4:
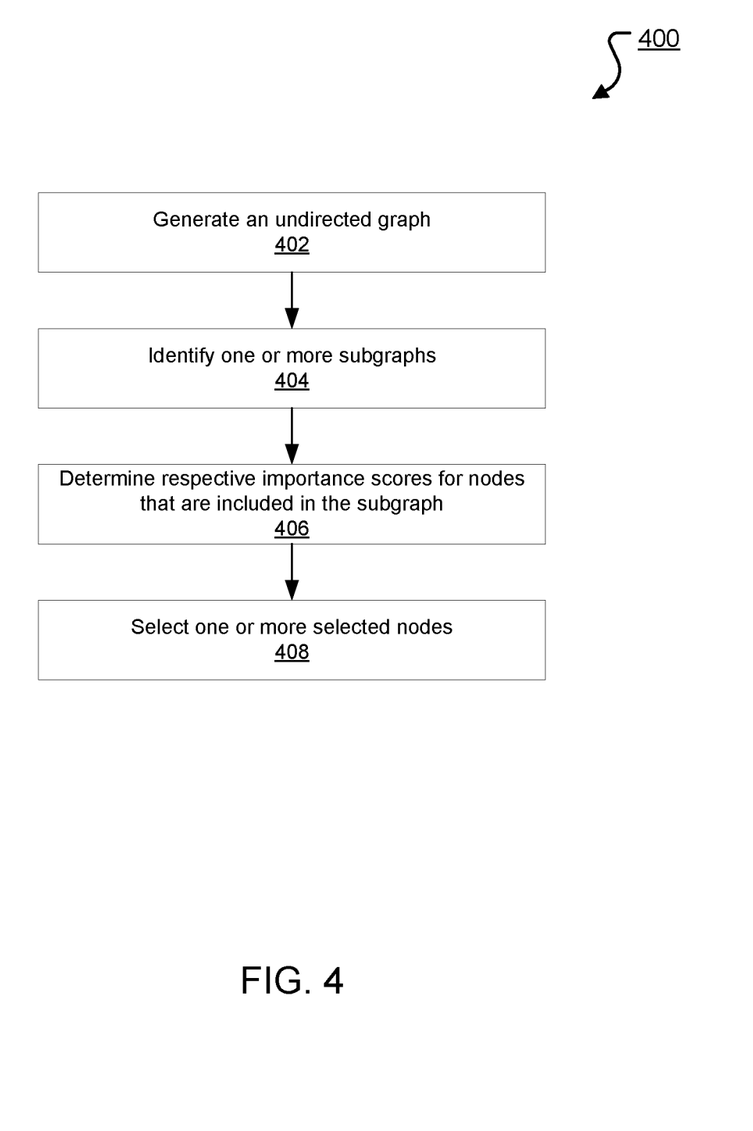
FIG. 4 is a flowchart illustrating an example process of selecting representative text from a cluster.

FIG. 4 is a flowchart illustrating an example process 400 of selecting representative text. For convenience, the process 400 will be described as being performed by a system of one or more computers located in one or more locations. For example, the system 100 of FIG. 1, appropriately programmed in accordance with this specification, can perform the process 400.

In general, the system can repeatedly perform the process 400 for each cluster. The clusters can be generated from either the first portion or the second portion of text reports. In some implementations, each cluster in turn includes respective aggregated text associated with text reports belonging to the cluster.

The system generates an undirected graph (402) having a plurality of nodes and a plurality of edges that connect a respective pair of nodes. Each node corresponds to a particular text included in the cluster.

Specifically, the system evaluates respective similarities between some or all of the nodes when generating the undirected graph. In general, the system can evaluate respective similarities using any suitable criterion or metric.

For example, the metric is cosine similarity. Cosine similarity is a measure of similarity between two non-zero vectors of an inner product space that measures the cosine of the angle between them. Typically, a similarity of a node with respect to the node itself is set to be 0.0.

The system then proceeds to connect respective pairs of node using the evaluation results. In other words, the system connects all pairs of similar nodes. In the example above, for every possible pair of nodes in the undirected graph, the system connects the pair of nodes upon determining that (i) one node is maximum cosine similar to the other node among all other nodes in the undirected graph and (ii) the cosine similarity between the pair of nodes is greater than a median of cosine similarities of all nodes in the undirected graph.

The system identifies one or more subgraphs (404) from the undirected graph using graph community detection algorithms including, for example, Louvain algorithm and label propagation algorithm. The algorithms partition the undirected graph into one or more subgraphs by identifying and grouping similar nodes in the undirected graph.

In some implementations, the system also constructs a directed sub graph for each identified subgraph. In other words, the system converts the one or more subgraphs that are identified from the undirected graph into corresponding directed subgraphs. For example, for every undirected edge connecting a respective pair of nodes in each identified subgraph, the system converts the undirected edge into two directed edges (i.e., in opposite directions) upon determining that one node is maximum cosine similar to the other node in the pair.

The system determines respective importance scores for nodes that are included in the subgraph (406) for each identified subgraph. Optionally, the system also determines respective importance scores for the one or more subgraphs. In general, the system can compute the importance scores using any suitable metric or combination of metric.

For example, the metric is total number of nodes. The system determines respective importance scores of each identified subgraph by determining a total number of nodes that are included in the identified subgraph.

As another example, the metric is PageRank score. The system determines respective importance scores by determining respective PageRank scores for nodes that are included in each directed subgraph.

As yet another example, the metric is a combination of the two previous metrics. Specifically, for each node included in each subgraph, the system computes the corresponding importance score as a sum of (i) total number of nodes in the subgraph and (ii) PageRank score for the node.

The system selects one or more selected nodes (408) from each identified subgraph and based at least on the respective importance scores. For example, the system sorts the nodes in descending order of corresponding importance scores and selects the one or more nodes with top importance scores. The one or more selected nodes correspond to the representative text of the cluster.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following numbered embodiments are also innovative:

Embodiment 1 is a method comprising:
  receiving a collection of text reports, wherein a first portion of the text reports are associated with respective concepts;
  performing a clustering process for a plurality of different cluster sizes, including generating, for each cluster size of the plurality of different cluster sizes, a plurality of different clusters of text reports from a second portion of the text reports, the second portion including at least one text report that does not have an associated concept;
  evaluating each of the plurality of different cluster sizes to select an optimal cluster size;
  generating, from the collection of text reports, clusters using the selected optimal cluster size;
  aggregating text associated with text reports in the first portion of text reports to generate respective first aggregated text for each cluster that is associated with a corresponding concept;
  aggregating text associated with text reports belonging to each respective cluster to generate respective second aggregated text for each cluster of the clusters generated using the selected optimal cluster size;
  maintaining a training dataset comprising the first and second aggregated text; and
  generating a predictive model from the training dataset to generate a concept for an input text report.

Embodiment 2 is the method of embodiment 1, wherein the method further comprises:
  performing sentiment analysis on one or more text reports in the second portion of text reports,
  wherein generating the clusters using the selected optimal cluster size comprises assigning text reports having similar sentiment to a same respective cluster.

Embodiment 3 is the method of any one of embodiments 1-2, wherein the method further comprises:
  augmenting the training set with a corpus of publically available text.

Embodiment 4 is the method of any one of embodiments 1-3, wherein the second portion of the text reports comprises text reports that are not associated with a concept.

Embodiment 5 is the method of any one of embodiments 1-3, wherein the collection of the text reports are all associated with a same issue in an organization.

Embodiment 6 is the method of any one of embodiments 1-5, wherein the method further comprises:
  receiving a test collection of text reports for which concepts are to be generated;
  performing the clustering process for a second plurality of different cluster sizes and evaluating each of the second plurality of different cluster sizes to select a second optimal cluster size;
  aggregating text associated with the test collection of text reports to generate test aggregated text for each cluster of the clusters generated using the second optimal cluster size; and
  providing the test aggregated text to the predictive model to generate respective concepts for the test collection of text reports.

Embodiment 7 is the method of any one of embodiments 1-6, wherein the method further comprises:
  augmenting the first portion of the text reports with text reports and generated concepts of the test collection of text reports; and
  regenerating the model using augmented first portion of the text reports having the generated concepts for the test collection of test reports.

Embodiment 8 is the method of any one of embodiments 1-7, wherein the method further comprises repeatedly reaugmenting the first portion of the text reports and regenerating the model as additional test collections of text reports are received.

Embodiment 9 is the method of any one of embodiments 1-8, wherein maintaining the training dataset comprises, for each aggregated text:
  selecting, from the aggregated text, selected text that is most representative of the aggregated text.

Embodiment 10 is the method of any one of embodiments 1-9, wherein the method further comprises, for each aggregated text:
  generating an undirected graph having a plurality of nodes and a plurality of edges that connect a respective pair of nodes, wherein each node corresponds to a text;
  identifying, from the undirected graph, one or more subgraphs;
  determining, for each identified subgraph, respective importance scores for nodes that are included in the subgraph; and
  selecting, from each identified subgraph and based at least on the respective importance scores, one or more selected nodes.

Embodiment 11 is the method of any one of embodiments 1-10, wherein determining respective importance scores for nodes that are included in the subgraph comprises:
  determining a total number of nodes that are included in each identified subgraph.

Embodiment 12 is the method of any one of embodiments 1-10, wherein determining respective importance scores for nodes that are included in the subgraph comprises:
  determining respective PageRank scores for nodes that are included in each identified subgraph.

Embodiment 13 is a system comprising: one or more computers and one or more storage devices storing instructions that are operable, when executed by the one or more computers, to cause the one or more computers to perform the method of any one of embodiments 1 to 12.

Embodiment 14 is a computer storage medium encoded with a computer program, the program comprising instructions that are operable, when executed by data processing apparatus, to cause the data processing apparatus to perform the method of any one of embodiments 1 to 12.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers, the method comprising:
   receiving a collection of text reports, wherein a first portion of the text reports are associated with respective concepts;
   performing a clustering process for a plurality of different cluster sizes, including generating, for each cluster size of the plurality of different cluster sizes, a plurality of different clusters of text reports from a second portion of the text reports, the second portion including at least one text report that does not have an associated concept;
   evaluating each of the plurality of different cluster sizes to select an optimal cluster size;
   generating, from the collection of text reports, clusters using the selected optimal cluster size;
   aggregating text associated with text reports in the first portion of text reports to generate respective first aggregated text for each cluster that is associated with a corresponding concept;
   aggregating text associated with text reports belonging to each respective cluster to generate respective second aggregated text for each cluster of the clusters generated using the selected optimal cluster size;
   maintaining a training dataset comprising the first and second aggregated text; and
   generating a predictive model from the training dataset to generate a concept for an input text report.

2. The method of claim 1, further comprising:
   performing sentiment analysis on one or more text reports in the second portion of text reports,
   wherein generating the clusters using the selected optimal cluster size comprises assigning text reports having similar sentiment to a same respective cluster.

3. The method of claim 1, further comprising:
   augmenting the training set with a corpus of publically available text.

4. The method of claim 1, wherein the second portion of the text reports comprises text reports that are not associated with a concept.

5. The method of claim 1, wherein the collection of the text reports are all associated with a same issue in an organization.

6. The method of claim 1, further comprising:
   receiving a test collection of text reports for which concepts are to be generated;
   performing the clustering process for a second plurality of different cluster sizes and evaluating each of the second plurality of different cluster sizes to select a second optimal cluster size;
   aggregating text associated with the test collection of text reports to generate test aggregated text for each cluster of the clusters generated using the second optimal cluster size; and
   providing the test aggregated text to the predictive model to generate respective concepts for the test collection of text reports.

7. The method of claim 6, further comprising:
   augmenting the first portion of the text reports with text reports and generated concepts of the test collection of text reports; and
   regenerating the model using augmented first portion of the text reports having the generated concepts for the test collection of test reports.

8. The method of claim 7, further comprising repeatedly reaugmenting the first portion of the text reports and regenerating the model as additional test collections of text reports are received.

9. The method of claim 1, wherein maintaining the training dataset comprises, for each aggregated text:
   selecting, from the aggregated text, selected text that is most representative of the aggregated text.

10. The method of claim 9, further comprising, for each aggregated text:
    generating an undirected graph having a plurality of nodes and a plurality of edges that connect a respective pair of nodes, wherein each node corresponds to a text;
    identifying, from the undirected graph, one or more subgraphs;
    determining, for each identified subgraph, respective importance scores for nodes that are included in the subgraph; and
    selecting, from each identified subgraph and based at least on the respective importance scores, one or more selected nodes.

11. The method of claim 10, wherein determining respective importance scores for nodes that are included in the subgraph comprises:
    determining a total number of nodes that are included in each identified subgraph.

12. The method of claim 10, wherein determining respective importance scores for nodes that are included in the subgraph comprises:
    determining respective PageRank scores for nodes that are included in each identified subgraph.

13. A system comprising one or more computers and one or more storage devices storing instructions that are operable, when executed by the one or more computers, to cause the one or more computers to perform operations comprising:

receiving a collection of text reports, wherein a first portion of the text reports are associated with respective concepts;

performing a clustering process for a plurality of different cluster sizes, including generating, for each cluster size of the plurality of different cluster sizes, a plurality of different clusters of text reports from a second portion of the text reports, the second portion including at least one text report that does not have an associated concept;

evaluating each of the plurality of different cluster sizes to select an optimal cluster size;

generating, from the collection of text reports, clusters using the selected optimal cluster size;

aggregating text associated with text reports in the first portion of text reports to generate respective first aggregated text for each cluster that is associated with a corresponding concept;

aggregating text associated with text reports belonging to each respective cluster to generate respective second aggregated text for each cluster of the clusters generated using the selected optimal cluster size;

maintaining a training dataset comprising the first and second aggregated text; and generating a predictive model from the training dataset to generate a concept for an input text report.

14. The system of claim 13, wherein the operations further comprise:

performing sentiment analysis on one or more text reports in the second portion of text reports, wherein generating the clusters using the selected optimal cluster size comprises assigning text reports having similar sentiment to a same respective cluster.

15. The system of claim 13, wherein the operations further comprise:

receiving a test collection of text reports for which concepts are to be generated;

performing the clustering process for a second plurality of different cluster sizes and evaluating each of the second plurality of different cluster sizes to select a second optimal cluster size;

aggregating text associated with the test collection of text reports to generate test aggregated text for each cluster of the clusters generated using the second optimal cluster size; and providing the test aggregated text to the predictive model to generate respective concepts for the test collection of text reports.

16. The system of claim 13, wherein maintaining the training dataset comprises, for each aggregated text:

selecting, from the aggregated text, selected text that is most representative of the aggregated text.

17. The system of claim 16, wherein the operations further comprise, for each aggregated text:

generating an undirected graph having a plurality of nodes and a plurality of edges that connect a respective pair of nodes, wherein each node corresponds to a text;

identifying, from the undirected graph, one or more subgraphs;

determining, for each identified subgraph, respective importance scores for nodes that are included in the subgraph; and selecting, from each identified subgraph and based at least on the respective importance scores, one or more selected nodes.

18. A non-transitory computer storage medium encoded with instructions that, when executed by one or more computers, cause the one or more computers to perform operations comprising:

receiving a collection of text reports, wherein a first portion of the text reports are associated with respective concepts;

performing a clustering process for a plurality of different cluster sizes, including generating, for each cluster size of the plurality of different cluster sizes, a plurality of different clusters of text reports from a second portion of the text reports, the second portion including at least one text report that does not have an associated concept;

evaluating each of the plurality of different cluster sizes to select an optimal cluster size;

generating, from the collection of text reports, clusters using the selected optimal cluster size;

aggregating text associated with text reports in the first portion of text reports to generate respective first aggregated text for each cluster that is associated with a corresponding concept;

aggregating text associated with text reports belonging to each respective cluster to generate respective second aggregated text for each cluster of the clusters generated using the selected optimal cluster size;

maintaining a training dataset comprising the first and second aggregated text; and generating a predictive model from the training dataset to generate a concept for an input text report.

19. The non-transitory computer storage medium of claim 18, wherein the operations further comprise:

performing sentiment analysis on one or more text reports in the second portion of text reports, wherein generating the clusters using the selected optimal cluster size comprises assigning text reports having similar sentiment to a same respective cluster.

20. The non-transitory computer storage medium of claim 18, wherein the operations further comprise:

receiving a test collection of text reports for which concepts are to be generated;

performing the clustering process for a second plurality of different cluster sizes and evaluating each of the second plurality of different cluster sizes to select a second optimal cluster size;

aggregating text associated with the test collection of text reports to generate test aggregated text for each cluster of the clusters generated using the second optimal cluster size; and providing the test aggregated text to the predictive model to generate respective concepts for the test collection of text reports.

* * * * *